(12) United States Patent
Iwasaki

(10) Patent No.: US 10,933,472 B2
(45) Date of Patent: Mar. 2, 2021

(54) CUTTING INSERT, DRILL, AND METHOD OF MANUFACTURING MACHINED PRODUCT USING THE SAME

(71) Applicant: KYOCERA CORPORATION, Kyoto (JP)

(72) Inventor: Kento Iwasaki, Yasu (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/481,875

(22) PCT Filed: Jan. 26, 2018

(86) PCT No.: PCT/JP2018/002499
§ 371 (c)(1),
(2) Date: Jul. 30, 2019

(87) PCT Pub. No.: WO2018/138584
PCT Pub. Date: Aug. 2, 2018

(65) Prior Publication Data
US 2019/0375024 A1     Dec. 12, 2019

(30) Foreign Application Priority Data

Jan. 30, 2017 (JP) .............................. JP2017-014295

(51) Int. Cl.
*B23B 27/16* (2006.01)
(52) U.S. Cl.
CPC .. *B23B 27/1603* (2013.01); *B23B 2200/0471* (2013.01); *B23B 2200/32* (2013.01)

(58) Field of Classification Search
CPC ............ B23B 27/1603; B23B 27/1607; B23B 27/143; B23B 27/1618; B23B 27/1637;
(Continued)

(56) References Cited

U.S. PATENT DOCUMENTS 4,359,300 A * 11/1982 Hazra ................... B23B 27/143
407/114
5,791,833 A 8/1998 Niebauer
(Continued)

FOREIGN PATENT DOCUMENTS

| CN | 105073316 A | 11/2015 |
|---|---|---|
| JP | H10512812 A | 12/1998 |

(Continued)

*Primary Examiner* — Alan Snyder
(74) *Attorney, Agent, or Firm* — Viering, Jentschura & Partner MBB

(57) ABSTRACT

A cutting insert may include a first surface and a second surface. The first surface may include a first side, a first corner, a second corner, and a breaker part. The breaker part may include a first segment, a second segment, and a third segment. The first segment may be an inclined surface inclined so as to approach the second surface as going away from the first side. The third segment may be an inclined surface inclined so as to separate from the second surface as going away from the second segment. In a front view of the first surface, a maximum value at a side of the second corner may be greater than a maximum value at a side of the first corner in a distance from the first side to a top portion of the third segment on an orthogonal line with respect to the first side.

13 Claims, 14 Drawing Sheets

(58) Field of Classification Search
CPC ............... B23B 27/1648; B23B 27/22; B23B 2200/0471; B23B 2200/32; B23B 2200/321
See application file for complete search history.

(56) References Cited

U.S. PATENT DOCUMENTS

| | | | |
|---|---|---|---|
| 8,727,676 B2 * | 5/2014 | Lof | ................. B23B 27/143 407/114 |
| 2011/0044776 A1 | 2/2011 | Ishi | |
| 2015/0246398 A1 | 9/2015 | Kawasaki | |
| 2016/0193668 A1 | 7/2016 | Matsunaga et al. | |
| 2018/0029141 A1 | 2/2018 | Ishi | |

FOREIGN PATENT DOCUMENTS

| | | |
|---|---|---|
| JP | 2014184523 A | 10/2014 |
| WO | 2009142323 A1 | 11/2009 |
| WO | 2014046260 A1 | 3/2014 |
| WO | 2016136949 A1 | 9/2016 |

* cited by examiner

CUTTING INSERT, DRILL, AND METHOD OF MANUFACTURING MACHINED PRODUCT USING THE SAME

CROSS-REFERENCE TO RELATED APPLICATIONS

This application is a national stage entry according to 35 U.S.C. 371 of PCT Application No. PCT/JP2018/002499 filed on Jan. 26, 2018, which claims priority to Japanese Application No. 2017-014295 filed on Jan. 30, 2017, which are entirely incorporated herein by reference.

TECHNICAL FIELD

The present disclosure relates to a cutting insert, a drill, and a method of manufacturing a machined product, which may be used in a cutting process.

BACKGROUND

As a cutting tool, a drill for use in a drilling process may be discussed in Patent Document 1 (refer to, for example, WO 2014/046260 (Patent Document 1)). The drill described in Patent Document 1 may include a base member (holder) having an axial line, and two inserts (an inner edge insert and an outer edge insert) attached to the base member.

The inner edge insert and the outer edge insert in the tool described in Patent Document 1 may be different in distance from the axial line of the tool. Chips generated by the inner edge insert and chips generated by the outer edge insert may be, therefore, different in shape. In each of the outer edge insert and the inner edge insert, chips generated at an inner peripheral side and chips generated at an outer peripheral side may also be different in shape. In this regard, there may be a need for chip discharge according to the shape.

For example, the chips generated by the outer edge insert may cause chip clogging if the chips extend excessively without being divided every proper length. In particular, chips generated by machining mild steel or the like are soft, and chip clogging tends to occur.

The present non-limiting embodiments may provide cutting inserts whose chip discharge performance is kept well even when machining a workpiece, such as mild steel, from which soft chips are generated.

SUMMARY

A cutting insert according to a non-limiting aspect of the present disclosure may include a first surface, a second surface, and a third surface. The first surface may include a first side, a first corner and a second corner each being adjacent to the first side, and a breaker part located along the first side. The second surface may be located on an opposite side of the first surface. The third surface may be located between the first surface and the second surface and along the first side. The breaker part may include a first segment, a second segment, and a third segment located in order from the first side. The first segment may be an inclined surface inclined so as to approach the second surface as going away from the first side. The third segment may be an inclined surface inclined so as to separate from the second surface as going away from the second segment.

An entirety of the second segment may be located closer to the second surface than the first side. At least a portion of the third segment may be located further away from the second surface than the first side. In a front view of the first surface, a maximum value at a side of the second corner may be greater than a maximum value at a side of the first corner in a distance from the first side to a top portion of the third segment on an orthogonal line with respect to the first side.

DETAILED DESCRIPTION

Figure 1:
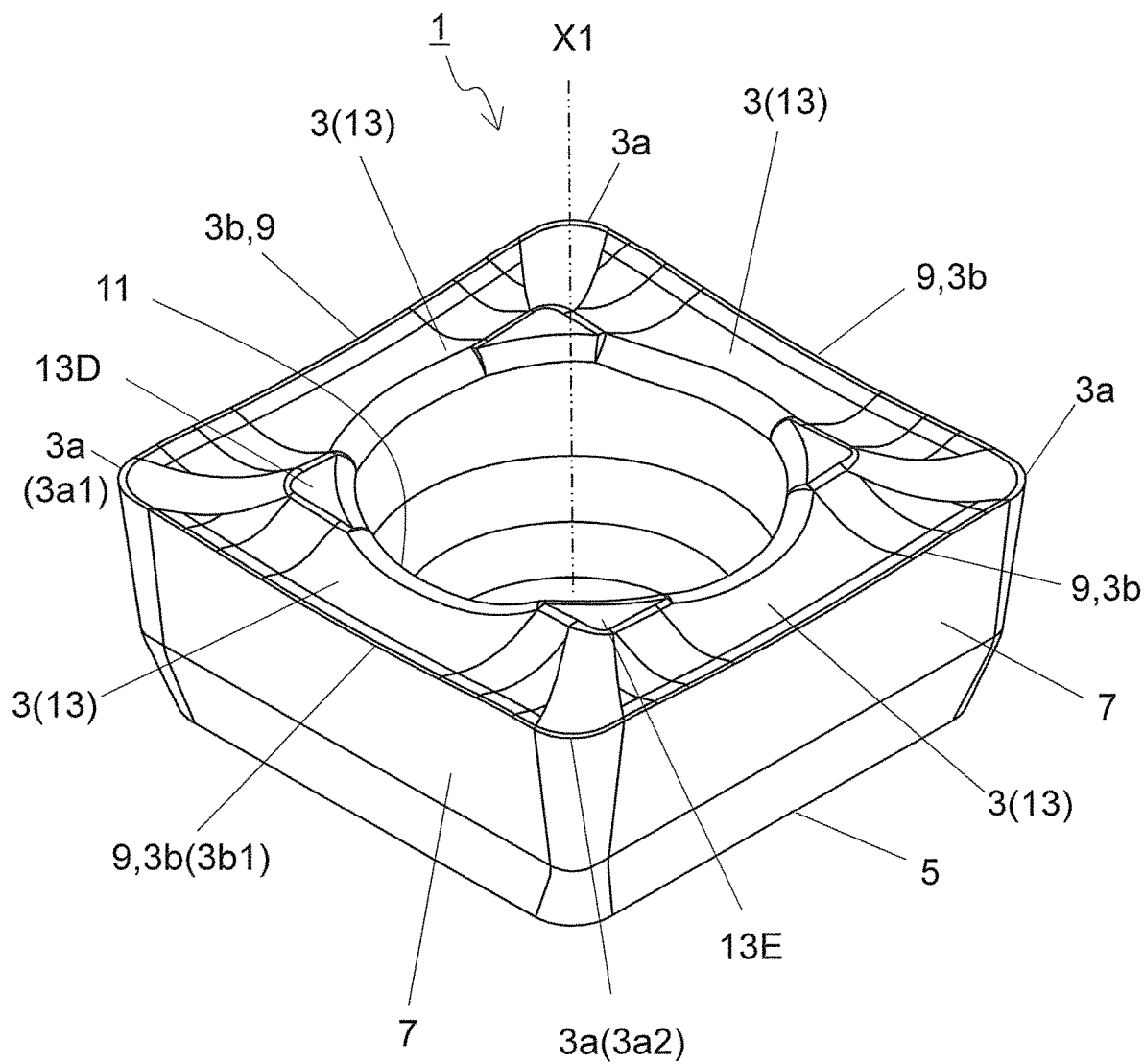
FIG. 1 is a perspective view illustrating a cutting inset in a non-limiting embodiment.

A cutting insert 1 (hereinafter also referred to as "the insert 1") and a drill 101 including the insert 1 in a non-limiting embodiment of the present disclosure may be described in detail below with reference to the drawings. For convenience of description, the drawings referred to in the following illustrate, in simplified form, only main members necessary for describing the non-limiting embodiments. Therefore, the inserts and the drills in the present disclosure may include any arbitrary component not illustrated in the drawings referred to.

Dimensions of the members in each of the drawings may not be ones which faithfully represent dimensions of actual structural members and dimension ratios of these members. These points may also be true for a method of manufacturing a machined product described later.

<Cutting Inserts>

The inserts 1 in non-limiting embodiments may be first described with reference to the drawings. The insert 1 in a non-limiting embodiment may be suitably usable as an outer edge insert in an indexable insert drill. The insert 1 may include, for example, a first surface 3, a second surface 5, a third surface 7, a cutting edge 9 and a through hole 11 as illustrated in FIG. 1.

For the purpose of easy visual understanding, the first surface 3, the second surface 5 and the third surface 7 may be replaced with the upper surface 3, the lower surface 5 and the side surface 7, respectively. The upper surface 3 may not need to be located above all the time in a state in which the insert 1 is attached to the drill or used in a cutting process. The lower surface 5 may not need to be located below all the time in the state in which the insert 1 is attached to the drill or used in the cutting process.

For example, cemented carbide and cermet may be usable as a material of the insert 1. Examples of composition of the cemented carbide may include WC—Co, WC—TiC—Co and WC—TiC—TaC—Co. The WC—Co may be produced by adding cobalt (Co) powder to tungsten carbide (WC), followed by sintering. The WC—TiC—Co may be produced by adding titanium carbide (TiC) to WC—Co. The WC—TiC—TaC—Co may be produced by adding tantalum carbide (TaC) to WC—TiC—Co.

The cermet may be a sintered composite material obtainable by compositing metal into a ceramic ingredient. Examples of the cermet may include ones which are composed mainly of a titanium compound, such as titanium carbide (TiC) and titanium nitride (TiN).

A surface of the insert 1 may be coated with a coating film by using a chemical vapor deposition (CVD) method and a physical vapor deposition (PVD) method. Examples of composition of the coating film may include titanium carbide (TiC), titanium nitride (TiN), titanium carbonitride (TiCN) and alumina ($Al_2O_3$).

At least a part of the upper surface 3 may serve as a rake surface. The upper surface 3 in the illustrated non-limiting embodiment may have a polygonal shape and may include a corner 3a and a side 3b. More specifically, the upper surface 3 may have an approximately quadrangular shape. Hence, the upper surface 3 in the illustrated non-limiting embodiment may include four corners 3a and four sides 3b. In a case, two of the four corners 3a which are located adjacent to each other are respectively referred to as a first corner 3a1 and a second corner 3a2, a first side 3b1 may be located between the first corner 3a1 and the second corner 3a2. In other words, the upper surface 3 in the illustrated non-limiting embodiment may include the first side 3b1, and the first corner 3a1 and the second corner 3a2 each being adjacent to the first side 3b1.

The term "polygonal shape" does not mean a precise polygonal shape. For example, each of the four corners 4 of the upper surface 3 may not be made into a precise corner, but may have a rounded shape in a top view. Each of the four sides may not be made into a precise straight line shape. The term "top view" may denote a state in which the insert 1 is viewed in a direction toward the upper surface 3, and may be rephrased as a front view of the first surface 3.

The lower surface 5 may be a surface located on an opposite side of the upper surface 3, and may serve as a seating surface when attaching the insert 1 to a holder. Similarly to the upper surface 3, the lower surface 5 may have a polygonal shape, or alternatively, may be a flat surface slightly smaller than the upper surface 3. An outer peripheral edge of the lower surface 5 may not be visible due to the upper surface 3 in the front view illustrated in FIG. 2.

The shapes of the upper surface 3 and the lower surface 5 may not be limited to the above non-limiting embodiment. Although the upper surface 3 and the lower surface 5 have the approximately quadrangular shape in the insert 1 of the illustrated non-limiting embodiment, the shapes of the upper surface 3 and the lower surface 5 may be, for example, a triangular shape, a pentagonal shape, a hexagonal shape or an octagonal shape. Although the upper surface 3 in the illustrated non-limiting embodiment has an approximately square shape, the quadrangular shape is not limited to this shape, but may be, for example, a rhombus shape or rectangular shape.

The insert 1 may include a through hole 11. The through hole 11 in the illustrated non-limiting embodiment may open into the upper surface 3 and the lower surface 5. The through hole 11 may be usable in the case of fixing the insert 1 to the holder of the drill. For example, the insert 1 may be fixable to the holder of the drill by inserting a screw into the through hole 11.

The lower surface 5 in the illustrated non-limiting embodiment may be a flat surface, and an extending direction of a central axis X1 of the through hole 11, in other words, a penetrating direction of the through hole 11 may be orthogonal to the lower surface 5. The central axis X1 of the through hole 11 may coincide with a central axis of the insert 1 in the illustrated non-limiting embodiment. The central axis X1 of the through hole 11 may therefore be rephrased as the central axis of the insert 1. Specifically, the central axis of the insert 1 may be an axis which extends between the upper surface 3 and the lower surface 5, and which serves as a rotation axis during rotation of the insert 1 in a top view.

The upper surface 3 may be rotationally symmetric about the central axis X1. The upper surface 3 in the non-limiting embodiment illustrated in FIG. 2 may include four corners 3a and the four sides 3b located so as to have 90° rotational symmetry around the central axis X1. Although not particularly being illustrated, the lower surface 5 may be 90° rotational symmetry around the central axis X1 in a bottom view. The term "bottom view" may denote a state in which the insert 1 is viewed in a direction toward the lower surface 5.

Figure 3:
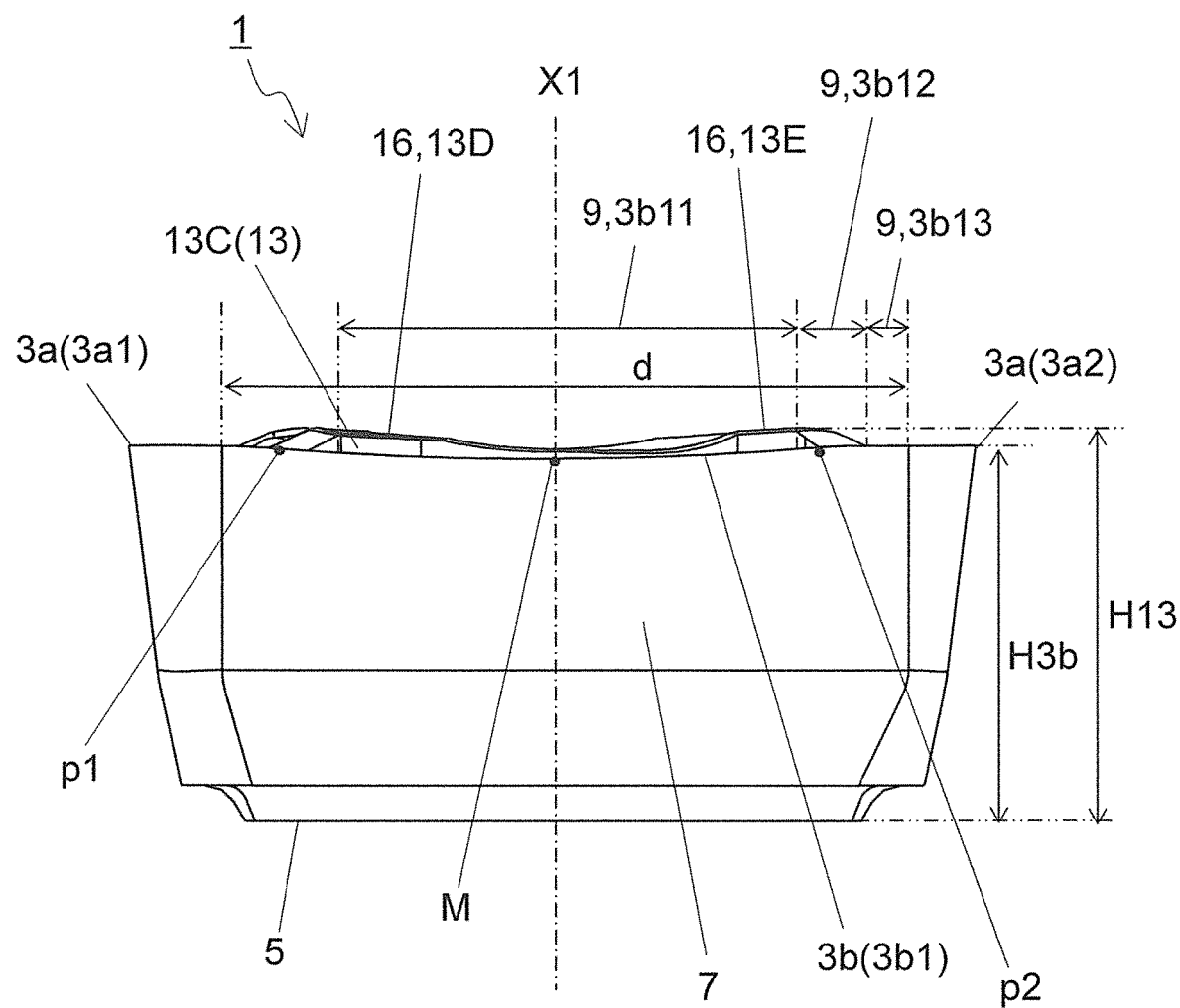
FIG. 3 is a front view of a third surface in the cutting insert illustrated in FIG. 1.

The side surface 7 may be located between the upper surface 3 and the lower surface 5 and along the first side 3b1. The side surface 7 may connect to the upper surface 3 and the lower surface 5. At least a part of the side surface 7 may serve as a flank surface. In cases where the lower surface 5 has a slightly smaller shape than the upper surface 3, the side surface 7 may be inclined so as to approach the central axis X1 as going from a side of the upper surface 3 toward a side of the lower surface 5 as illustrated in FIG. 3.

A maximum width of the upper surface 3 in a top view may be, for example, 3-25 mm. A height from the lower surface 5 to the upper surface 3 may be, for example, 1-10 mm. The term "height from the lower surface 5 to the upper surface 3" may denote a length in a direction parallel to the central axis X1 in between an upper end (the highest portion) of the upper surface 3 and a lower end (the lowest portion) of the lower surface 5 in a side view. The "side view" may denote viewing the insert 1 in a direction toward the side surface 7 and from a direction orthogonal to the central axis X1 of the through hole 11.

The configurations of the upper surface 3, the lower surface 5 and the side surface 7 may not be limited to the above non-limiting embodiment. For example, the lower surface 5 may have the same shape as the upper surface 3, and an outer peripheral edge of the lower surface 5 may be overlapped with an outer peripheral edge of the upper surface 3 in a planar perspective. In this case, the side surface 7 may be orthogonal to the lower surface 5.

The cutting edge 9 may be located at least at a part of a ridgeline where the upper surface 3 intersects with the side surface 7. The cutting edge 9 may be located at least at a part of the first side 3b1 in the illustrated non-limiting embodiment. The cutting edge 9 may be usable for cutting a workpiece in a cutting process.

Figure 2:
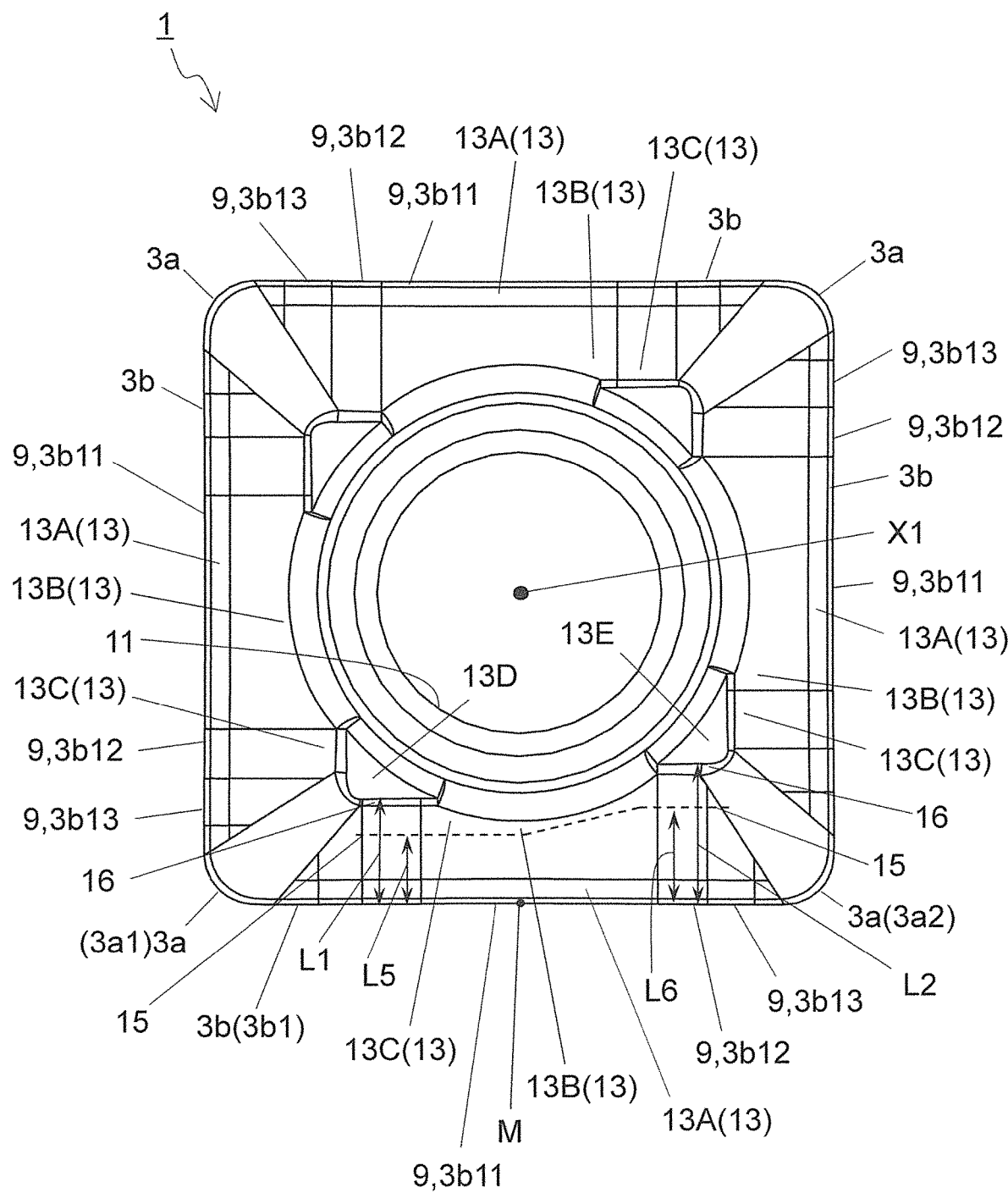
FIG. 2 is a front view of a first surface in the cutting insert illustrated in FIG. 1.

The cutting edge 9 may be located at each of the four sides 3b as illustrated in FIGS. 2 and 3. Alternatively, the cutting edge 9 may be located over the entirety of the first side 3b1. Still alternatively, the cutting edge 9 may also be located at the corner 3a besides the side 3b.

In cases where the cutting process is carried out by using the cutting edge 9 located at the first side 3b1 as a cutting edge for an outer edge insert, the insert 1 may be attached to the holder so that a side of the first corner 3a1 in the cutting edge 9 becomes nearer to the rotation axis of the drill than a side of the second corner 3a2. The cutting edge 9 located at the first side 3b1 and a region of the upper surface 3 which extends along the first side 3b1 may be described below.

As illustrated in FIGS. 4 to 8, the upper surface 3 may include a breaker part 13 located along the first side 3b1. The breaker part 13 may have the function of curling chips during the cutting process. The breaker part 13 may include a first segment 13A, a second segment 13B and a third segment 13C located in order from the first side 3b1. The first segment 13A in the breaker part 13 may be located closest to the first side 3b1, and the third segment 13C in the breaker part 13 may be located farthermost to the first side 3b1 in the illustrated non-limiting embodiment. The second segment 13B may be located between the first segment 13A and the third segment 13C.

As illustrated in FIGS. 5 to 8, the first segment 13A may be an inclined surface inclined so as to approach the lower surface 5 as going away from the first side 3b1. The third segment 13C may be an inclined surface inclined so as to separate from the lower surface 5 as going away from the second segment 13B. That is, the first segment 13A may be a downward inclined surface that is inclined downward as going toward the inside of the upper surface 3. The third segment 13C may be an upward inclined surface that is inclined upward as going toward the inside of the upper surface 3. The term "inside" may denote a side of the through hole 11 (a side of the central axis X1). The term "upward" may denote a direction from a side of the lower surface 5 toward a side of the upper surface 3 in a direction along the central axis X1. The term "downward" may denote a direction from the side of the upper surface 3 toward the side of the lower surface 5 in the direction along the central axis X1.

The entirety of the second segment 13B may be located closer to the lower surface 5 than the first side 3b1 in the non-limiting embodiment illustrated in FIG. 3. At least a part of the third segment 13C may be located further away from the lower surface 5 than the first side 3b1 in the non-limiting embodiment illustrated in FIG. 3. If a maximum distance of an individual component from the lower surface 5 in a direction along the central axis X1 is regarded as a height of the individual component, a height H13 of the third segment 13C may be greater than a height H3b of the first side 3b1 in the non-limiting embodiment illustrated in FIG. 3. In cases where the lower surface 5 does not have a flat surface shape, a distance from an imaginary plane (reference plane S) orthogonal to the central axis X1 of the through hole 11 may be evaluated at the height described above.

Figure 4:
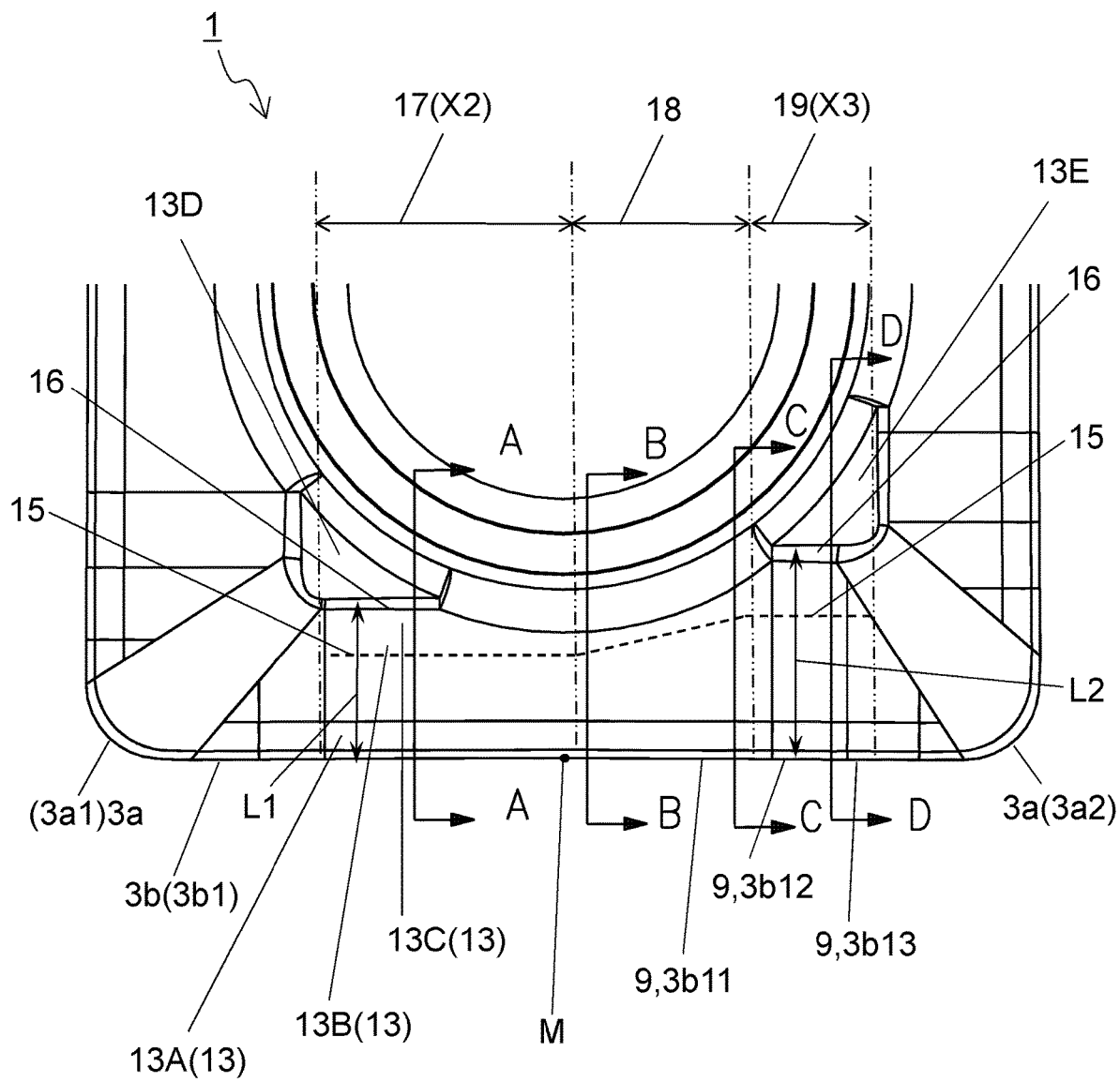
FIG. 4 is a partially enlarged view of FIG. 3.

As illustrated in FIGS. 2 and 4, in a top view of the insert 1, a maximum value L2 of a distance at a side of the second corner 3a2 (hereinafter also referred to simply as the distance L2) may be greater than a maximum value L1 of a distance at a side of the first corner 3a1 (hereinafter also referred to simply as the distance L1) in a distance from the first side 3b1 to a top portion 16 of the third segment 13C on an orthogonal line with respect to the first side 3b1. That is, the distance from the first side 3b1 to the third segment 13C may be greater at the side of the second corner 3a2 than that at the side of the first corner 3a1.

As illustrated in FIGS. 2 and 4, the distance L1 and the distance L2 can be regarded as a distance from the first side 3b1 to the top portion 16 of the third segment 13C in the direction orthogonal to the first side 3b1 in a top view. As described above, because the third segment 13C is the inclined surface inclined upward as going away from the first side 3b1, the top portion 16 of the third segment 13C can be rephrased as an inner peripheral edge of the third segment 13C.

The phrase that "the distance L2 is greater than the distance L1" may denote that a distance at the third segment 13C2 located closest to the side of the second corner 3a2 is greater than the distance at the third segment 13C1 located closest to the side of the first corner 3a1 if the distance from the first side 3b1 to the top portion 16 of the third segment 13C in the direction orthogonal to the first side 3b1 is evaluated along the first side 3b1.

In a case, the distance from the first side 3b1 to the top portion 16 of the third segment 13C in the direction orthogonal to the first side 3b1 is evaluated along the first side 3b1 and in a direction from the side of the first corner 3a1 to the side of the second corner 3a2, the third segment 13C may include a region where the above distance becomes constant.

Thus, the breaker part 13 including the third segment 13C where the distance L1 and the distance L2 have the above relationship and at least a part thereof is located above the first side 3b1 may be located along the first side 3b1 in the present disclosure. Chips that tend to extend upward may be therefore easily contactable with the third segment 13C located above the first side 3b1, and the chips that have come into contact with the third segment 13C on a forward side in an advance direction may be consequently bent by being pushed against the second segment 13B of the breaker part 13.

Besides the above, the distance L2 at the side of the second corner 3a2 located at an outer peripheral side of the drill may be greater than the distance L1 at the side of the first corner 3a1 located at an inner peripheral side of the drill. Consequently, the action of pushing the chips against the second segment 13B of the breaker part 13 may become relatively great at the inner peripheral side. A relatively large space in the advance direction of chips can be ensured at the outer peripheral side.

A fold may occur on a chip by the pushing action and the chip may tend to have a locally large thickness portion at the inner peripheral side. The portion therefore may tend to be cracked and the chip may tend to be divided. A chip whose generation speed is relatively high may be less likely to be caught in the breaker part 13 at the outer peripheral side. Hence, even if a soft chip that tends to extend upward is generated, the chip may be easily controllable by the breaker part 13, thus leading to improvement in chip discharge performance.

In particular, the generated chip may tend to be pulled toward the outer peripheral side of the drill by centrifugal force during a cutting process using a machining center. If a relationship between the distance L1 and the distance L2, namely, the distance L1<the distance L2 is satisfied, the chip at the outer peripheral side, which tends to be pulled by centrifugal force, can be more stably, easily brought into contact with the third segment 13C. Even during the cutting process using the machining center, the chip can be stably curled by the breaker part 13, thus leading to a smooth chip discharge.

The distance L2 may be, for example, 130% or more of the distance L1. In this case, chips generated at the inner peripheral side of the drill (the side of the first corner 3a1) and at outer peripheral side (the side of the second corner 3a2) in the drill, which are different in generation speed because of being different in cutting speed, may be less likely to come into vigorous contact with the breaker part 13 so as to be caught therein on the outer peripheral side.

The distance L2 may be, for example, 150% or less of the distance L1. In this case, chip clogging may be less likely to occur even in the cutting process using the machining center during which chips tend to be pulled outward by centrifugal force. The distance L1 may be, for example, 0.5-2 mm. The distance L2 may be, for example, 0.8-3 mm.

As illustrated in FIG. 4, the breaker part 13 may be changed stepwise in a distance from the first side 3b1 to the top portion 16 at the third segment 13C. That is, if the breaker part 13 is viewed along the first side 3b1, a certain region X2 having the distance L1 may be located at a side of the first corner 3a1, and a certain region X3 having the distance L2 may be located at a side of the second corner 3a2 in the third segment 13C.

In cases where the distance from the first side 3b1 to the top portion 16 at the third segment 13C is changed stepwise, it may be easy to ensure large regions respectively having the distance L1 and the distance L2 in a direction along the first side 3b1 even if the insert 1 has a small dimension. Irrespective of the dimension of the insert 1, a suitable curling action may be attainable by the breaker part 13, thus leading to a stable chip discharge.

In cases where the third segment 13C include the certain region X2 and the certain region X3, a dimension in a direction along the first side 3b1 of the certain region X2 having the relatively small distance L1 may be settable to, for example, 0.2 d to 0.4 d when d is a length of the first side 3b1. In these cases, because of an excessively large number of regions located near the first side 3b1 in the third segment 13C, breaker action may become large and chips may be therefore less likely to be burned. As illustrated in FIG. 3, the length d of the first side 3b1 may be settable to 0.6-0.85 times a length of the side 3b, and may be settable to, for example, 5-30 mm. As illustrated in FIG. 4, the above-mentioned dimension in the certain region X2 may be settable to, for example, 1-12 mm, and the above-mentioned dimension in the certain region X3 may be settable to, for example, 1-6 mm.

The distance from the cutting edge 9 to the top portion 16 at the third segment 13C in the breaker part 13 may not be limited to a stepwise changing structure. For example, the distance from the cutting edge 9 to the top portion 16 at the third segment 13C in the breaker part 13 may gradually increase from the first corner 3a1 toward the second corner 3a2.

An inclination angle $\theta1$ of the first segment 13A may be constant along the first side 3b1 as illustrated in FIGS. 5 to 8. With this configuration, cutting resistance applied to the cutting edge 9 during biting can be held in a well-balanced manner in a range from the inner peripheral side to the outer peripheral side of the drill. Hence, the chip curling action by the breaker part 13 may be less likely to deteriorate due to imbalanced cutting resistance applied to the cutting edge 9 during biting. This may lead to the effective chip curling action by the breaker part 13.

The inclination angle $\theta1$ of the first segment 13A may be a so-called rake angle of the first segment 13A. Accordingly, the inclination angle $\theta1$ of the first segment 13A can be regarded as, for example, an inclination angle of the first segment 13A relative to an arbitrary reference plane orthogonal to the central axis X1 in a cross section orthogonal to the first side 3b1. The inclination angle $\theta1$ of the first segment 13A in an arbitrary cross section orthogonal to the first side 3b1 may be constant as illustrated in FIGS. 5 to 8. The term "being constant" may denote that it may be substantially constant and may include an error of, for example, ±1°. The inclination angle $\theta1$ of the first segment 13A may be settable to, for example, 15-20°.

In cases where the first segment 13A has a curved surface shape, an inclination angle of the first segment 13A at an outer peripheral edge of the first segment 13A may be the inclination angle $\theta1$ of the first segment 13A in the cross section orthogonal to the first side 3b1.

Figure 5:
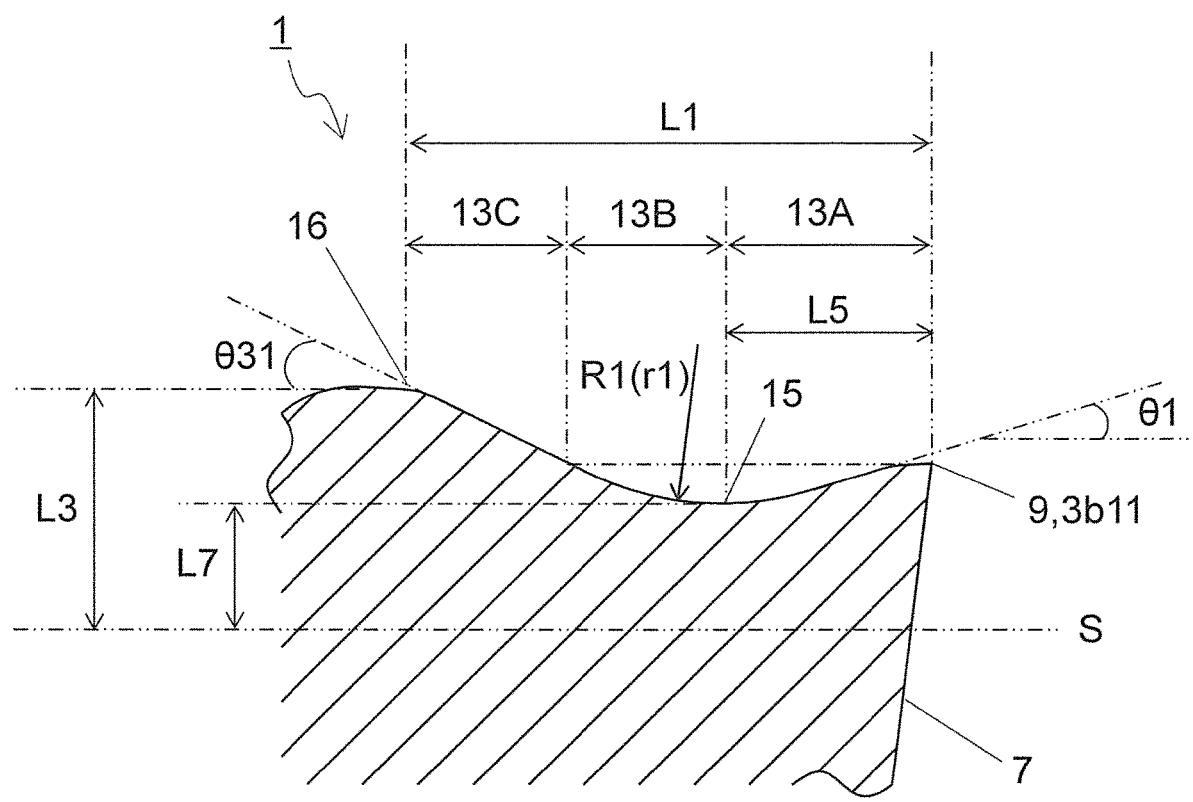
FIG. 5 is a sectional view taken along line A-A in the cutting insert illustrated in FIG. 4.
Figure 6:
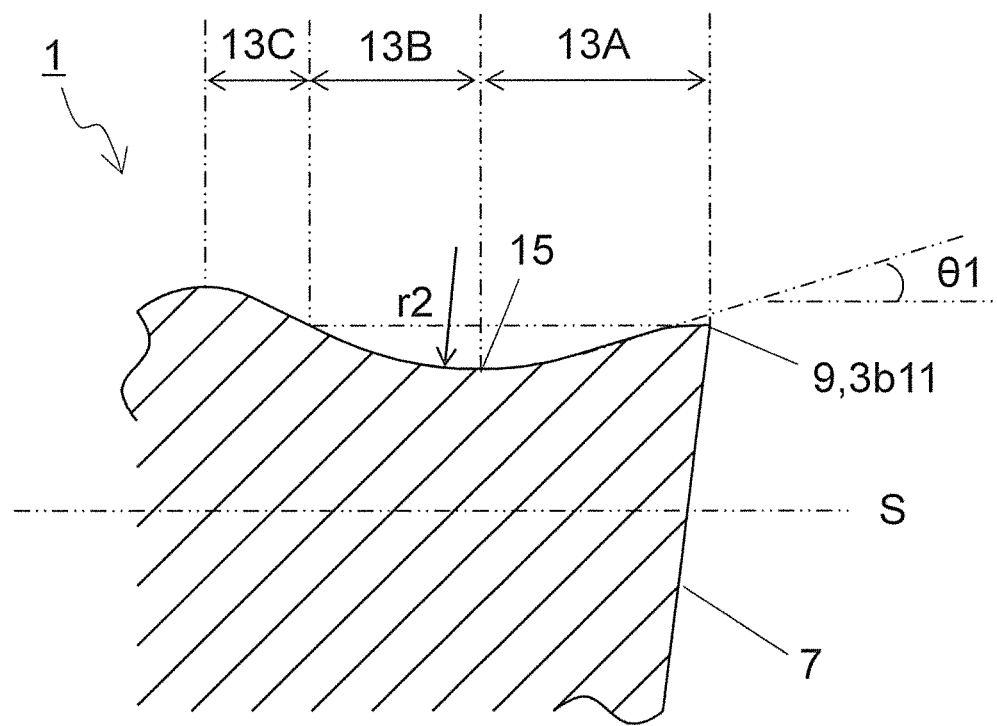
FIG. 6 is a sectional view taken along line B-B in the cutting insert illustrated in FIG. 4.
Figure 7:
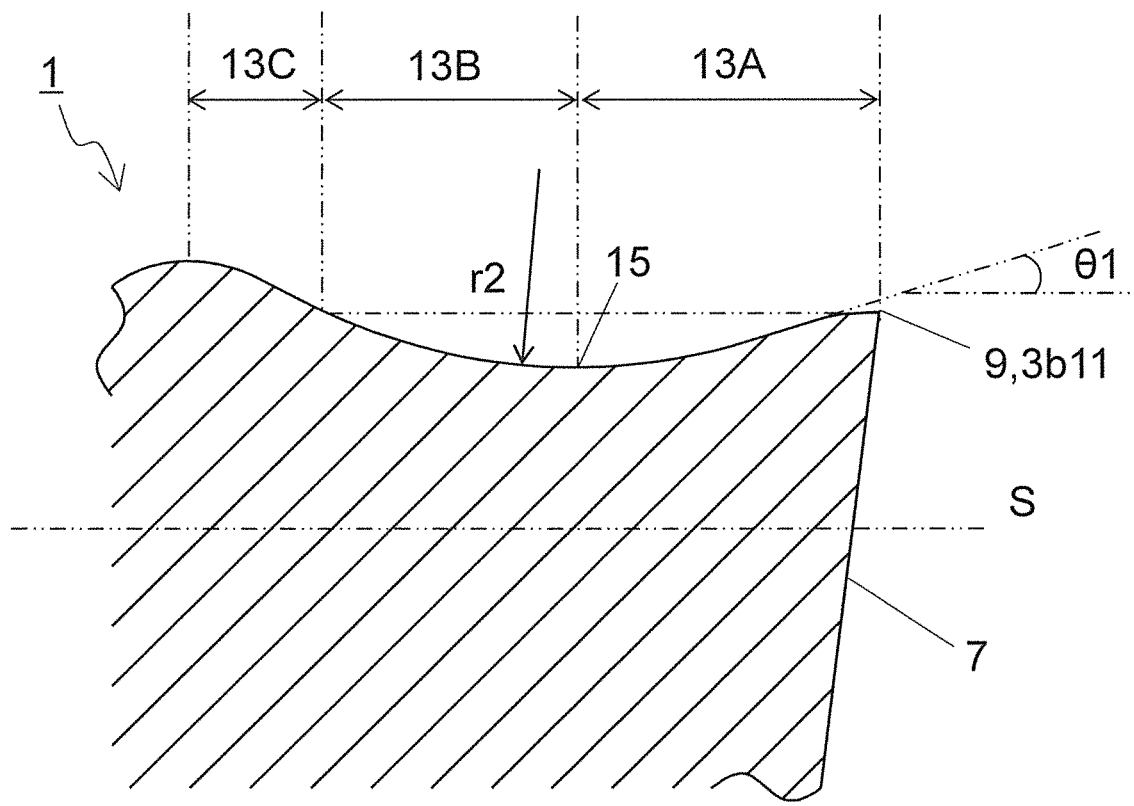
FIG. 7 is a sectional view taken along line C-C in the cutting insert illustrated in FIG. 4.
Figure 8:
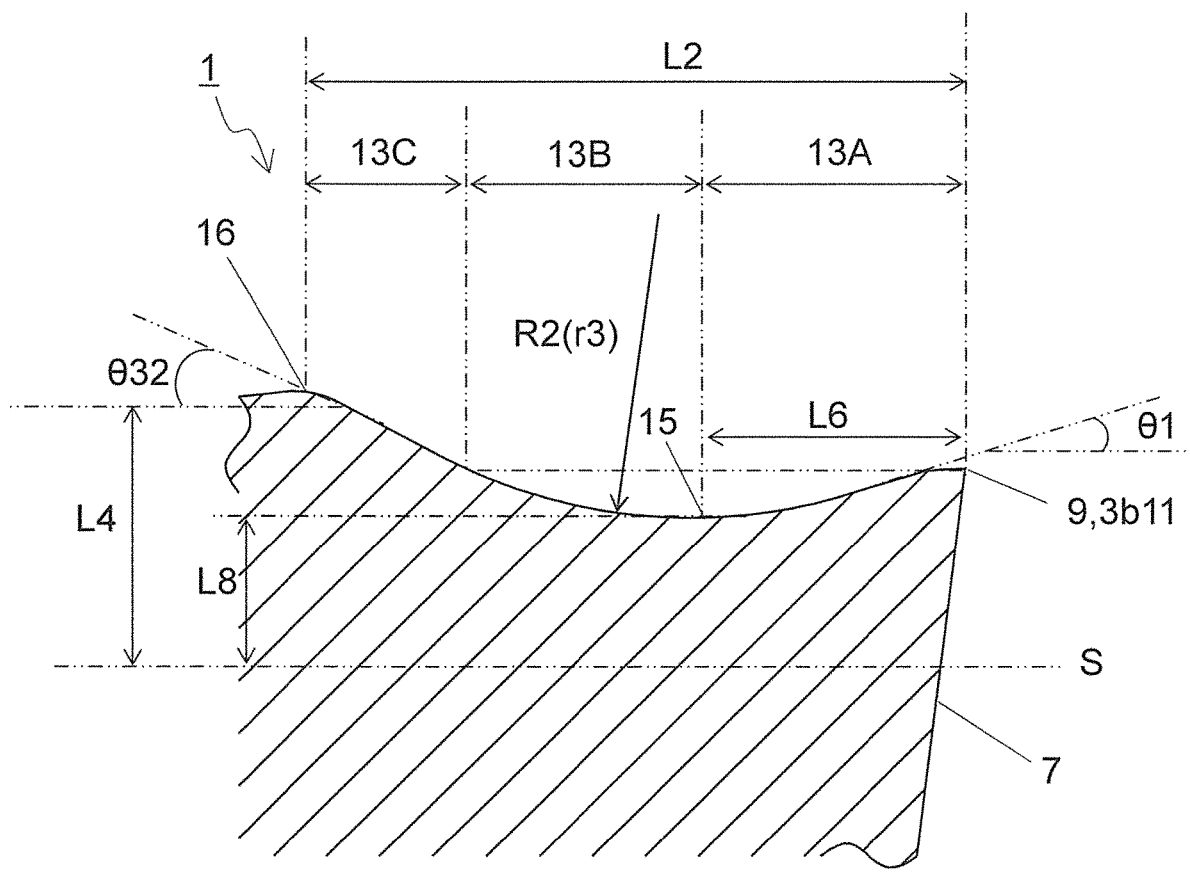
FIG. 8 is a sectional view taken along line D-D in the cutting insert illustrated in FIG. 4.

An inclination angle $\theta32$ of the third segment 13C at a side of the second corner 3a2 may be smaller than an inclination angle $\theta31$ of the third segment 13C at a side of the first corner 3a1 as illustrated in FIGS. 5 and 8. With this configuration, impact generated by a contact between the third segment 13C and chips at the outer peripheral side where generation speed is relatively high may be less likely to be increased excessively. This may contribute to enhancing the effect of suitably curling chips by the breaker part 13.

The inclination angles $\theta31$ and $\theta32$ of the third segment 13C can be calculated in the same manner as in the inclination angle $\theta1$ of the first segment 13A. Specifically, each of the inclination angles $\theta31$ and $\theta32$ of the third segment 13C can be regarded as, for example, an inclination angle of the third segment 13C relative to the arbitrary reference plane orthogonal to the central axis X1 in the cross section orthogonal to the first side 3b1.

In other words, as illustrated in FIG. 5, an inclination angle of the third segment 13C relative to the reference plane S in the cross section that passes through the third segment 13C located at a side of the first corner 3a1 and is orthogonal to the first side 3b1 can be regarded as the inclination angle $\theta31$. This may be also true for the inclination angle $\theta32$ of the third segment 13C. In the third segment 13C, the inclination angle $\theta31$ may be, for example, 25-30°, and the inclination angle $\theta32$ may be, for example, 23-28°.

The phrase that "the inclination angle $\theta32$ is smaller than the inclination angle $\theta31$" may denote that if the inclination angle of the third segment 13C is evaluated along the first side 3b1, an inclination angle at the third segment 13C2 located closest to the second corner 3a2 may be smaller than an inclination angle at the third segment 13C1 located closest to the first corner 3a1. Therefore, if the inclination angle of the third segment 13C is evaluated along the first side 3b1 and in a direction from the side of the first corner 3a1 toward the side of the second corner 3a2, a region where the above-mentioned inclination angle may become constant may be present at the third segment 13C.

As illustrated in FIG. 3, a maximum value L4 of a distance from the lower surface 5 to the third segment 13C at a side of the second corner 3a2 (hereinafter also referred to simply as "distance L4") may be greater than a maximum value L3 of a distance from the lower surface 5 to the third segment 13C at a side of the first corner 3a1 (hereinafter also referred to simply as "distance L3"). In other words, a height of the third segment 13C may be greater at the side of the second corner 3a2 than that at the side of the first corner 3a1.

If the distance L3 and the distance L4 have the above relationship, because of a relatively high generation speed, chips may be easily contactable with the third segment 13C of the breaker part 13 at a side of the second corner 3a2 located at the outer peripheral side of the drill where chips are more likely to go above the insert 1 and pass through.

This may make it possible to more stably control the chips at the outer peripheral side, thus leading to improvement in chip discharge performance.

As illustrated in FIG. 3, the distance L3 and the distance L4 can be regarded as a distance from the lower surface 5 to the top portion 16 of the third segment 13C in a direction along the central axis X1 in a side view. The phrase that "the distance L4 is greater than the distance L3" can be evaluated in the same manner as in the phrase that "distance L2 is greater than the distance L1." In other words, the phrase that "the distance L4 is greater than the distance L3" may denote that if the distance from the lower surface 5 to the top portion 16 of the third segment 13C in the direction along the central axis X1 is evaluated along the first side 3b1, a distance at the third segment 13C2 located closest to the second corner 3a2 may be greater than a distance at the third segment 13C1 located closest to the first corner 3a1. Therefore, if the distance from the lower surface 5 to the top portion 16 of the third segment 13C in the direction along the central axis X1 is evaluated along the first side 3b1 and in a direction from the first corner 3a1 toward the second corner 3a2, a region where the above-mentioned distance becomes constant may be present at the third segment 13C.

Evaluation of a dimensional relationship between the distance L3 and the distance L4 may be made by using a distance to the top portion 16 of the third segment 13C on the basis of the reference plane S orthogonal to the central axis X1 as the distance from the lower surface 5 to the top portion 16 of the third segment 13C as illustrated in FIGS. 5 and 8. Specifically, a dimension of a distance from the reference plane S to the top portion 16 of the third segment 13C may be evaluated at a side of the first corner 3a1 and at a side of the second corner 3a2.

As the distance from the lower surface 5 to the top portion 16 of the third segment 13C, the distance L3 may be, for example, 0.95-10.4 mm, and the distance L4 may be, for example, 1-10.5 mm.

The breaker part 13 may include a first top surface 13D located at a side of the first corner 3a1 and a second top surface 13E located at a side of the second corner 3a2. The first top surface 13D in the illustrated non-limiting embodiment may be located at a further inner side of the upper surface 3 at a side of the first corner 3a1 than the third segment 13C. The second top surface 13E in the illustrated non-limiting embodiment may be located at a further inner side of the upper surface 3 at a side of the second corner 3a2 than the third segment 13C.

The top portion 16 of the third segment 13C at the side of the first corner 3a1 may be located at a boundary between the third segment 13C and the first top surface 13D. The top portion 16 of the third segment 13C at the side of the second corner 3a2 may be located at a boundary between the third segment 13C and the second top surface 13E.

The first top surface 13D may be inclined so as to approach the lower surface 5 as going from a side of the first corner 3a1 toward a side of the second corner 3a2. In cases where the first top surface 13D has the above configuration, if chips go over the third segment 13C, the chips may be more likely to flow toward the second corner 3a2 than the first corner 3a1. In cases where the second corner 3a2 is located further away from the rotation axis of the drill than the first corner 3a1, the chips may tend to flow toward the outer peripheral side of the drill, thus leading to excellent chip discharge performance.

The second top surface 13E may be inclined so as to approach the lower surface 5 as going away from the first side 3b1. In cases where the second top surface 13E has the above configuration, if chips go over the third segment 13C, the chips may be less likely to come into contact with the second top surface 13E. In cases where the second corner 3a2 is located further away from the rotation axis of the drill than the first corner 3a1, the chips may tend to flow toward the outer peripheral side of the drill, thus leading to excellent chip discharge performance.

The breaker part 13 may include a bottom part 15 located at a side of the lower surface 5. Specifically, the bottom part 15 may correspond to a part of the breaker part 13 which is located at a side closest (lowermost) to the lower surface 5 in a cross section orthogonal to the first side 3b1. In other words, the bottom part 15 may correspond to a lowermost portion of the breaker part 13 in the above cross section. The bottom part 15 may extend along the first side 3b1.

In a top view of the insert 1 as in the non-limiting embodiment illustrated in FIG. 2, in terms of distance from the first side 3b1 to the bottom part 15 of the breaker part 13 in an orthogonal line with respect to the first side 3b1, a maximum value L6 of a distance at a side of the second corner 3a2 (hereinafter also referred to simply as "distance L6") may be greater than a distance at a side of the first corner 3a1 (hereinafter also referred to simply as "distance L5").

If the distance L6 is greater than the distance L5, chips generated at the outer peripheral side of the drill where chip generation speed is high and a curl diameter is great may be relatively slow than chips generated at the inner peripheral side are pushed against the bottom part 15 of the breaker part 13. The chips having a great curl diameter may be less likely to be caught in the breaker part 13.

Specifically, the distance L5 may be a dimension from the first side 3b1 at a side of the first corner 3a1 to the bottom part 15 in a direction orthogonal to the first side 3b1 in a top view as illustrated in FIG. 2. Similarly, the distance L6 may be a dimension from the first side 3b1 at a side of the second corner 3a2 to the bottom part 15 in a direction orthogonal to the first side 3b1 in a top view. The phrase that "the distance L6 is greater than the distance L5" can be evaluated in the same manner as in the above phrase that "the distance L2 is greater than the distance L1."

The second segment 13B may have a circular-arc shaped curved surface shape as described later. In this case, the lowermost portion of the bottom part 15 can be defined by a single point. However, if a bottom of the second segment 13B is a flat surface, the lowermost portion of the bottom part 15 can be defined by a region having a width. In this case, the distance L5 and the distance L6 may be a minimum value of a dimension from the first side 3b1 to the bottom of the second segment 13B in a direction orthogonal to the first side 3b1 in a top view.

The distance L5 may be, for example, 0.2-1.5 mm. The distance L6 may be, for example, 0.3-1.8 mm.

The distance from the first side 3b1 to the bottom part 15 may be changed stepwise in the breaker part 13. A position of the bottom part 15 may be indicated by dotted line in FIG. 4. Thus, in a view along the first side 3b1, the distance from the first side 3b1 to the bottom part 15 may be the distance L5 in the certain region X2, and the distance from the first side 3b1 to the bottom part 15 may be the distance L6 in the certain region X3.

In cases where the distance from the first side 3b1 to the bottom part 15 is changed stepwise as described above, a region having a relatively small distance can be disposed at a certain width in the direction along the first side 3b1. It is therefore easy to ensure a stable contact between the breaker part 13 and chips at the inner peripheral side. This may lead to a stable chip curling action at the inner peripheral side.

The distance from the first side 3b1 to the bottom part 15 in a region located between the certain region X2 and the certain region X3 may increase as going away from the certain region X2.

As illustrated in FIGS. 5 and 8, a maximum value L8 of a distance from the lower surface 5 to the bottom part 15 at a side of the second corner 3a2 (hereinafter also referred to simply as "distance L8") may be smaller than a maximum value L7 of a distance from the lower surface 5 to the bottom part 15 at a side of the first corner 3a1 (hereinafter also referred to simply as "distance L7").

Specifically, a height of the bottom part 15 at the side of the second corner 3a2 may be smaller than that at the side of the first corner 3a1. More specifically, a depth of the bottom part 15 at the side of the second corner 3a2 may be greater than that at the side of the first corner 3a1.

If the bottom part 15 has the above configuration, chips generated at the outer peripheral side of the drill, in which chip generation speed is high and a curl diameter tends to become great, may be easily contactable with the bottom part 15 of the breaker part 13 at a relatively low speed than chips generated at the inner peripheral side. The chips having a great curl diameter may be less likely to be caught in the breaker part 13.

The distance L7 may be a dimension from the lower surface 5 to the bottom part 15 at the side of the first corner 3a1 in a direction along the central axis X1. Similarly, the distance L8 may be a dimension from the lower surface 5 to the bottom part 15 at the side of the second corner 3a2 in the direction along the central axis X1.

Similarly to the distance L3 and the distance L4, the distance L7 and the distance L8 may be evaluated by using a distance to the bottom part 15 on the basis of the reference plane S orthogonal to the central axis X1 as the distance from the lower surface 5 to the bottom part 15 as illustrated in FIGS. 5 and 8. Specifically, a dimension of a distance from the reference plane S to the bottom part 15 at the side of the first corner 3a1 and at the side of the second corner 3a2 may be evaluated. The phrase that "the distance L8 is smaller than the distance L7" can be evaluated in the same manner as in the above phrase "the distance L2 is greater than the distance L1."

As the distance from the lower surface 5 to the bottom part 15, the distance L7 may be, for example, 0.9-9.5 mm, and the distance L8 may be, for example, 0.8-9 mm.

The distance from the lower surface 5 to the bottom part 15 at the second segment 13B of the breaker part 13 may be changed stepwise. Specifically, in a view along the first side 3b1, the distance from the lower surface 5 to the bottom part 15 may be the distance L7 in the certain region X2, and the distance from the lower surface 5 to the bottom part 15 may be the distance L8 in the certain region X3. In cases where the distance from the lower surface 5 to the bottom part 15 is changed stepwise as described above, a region having a relatively small distance (namely, a region where the bottom part 15 has a great depth) can be disposed at a certain width in the direction along the first side 3b1. The chips that are generated at the outer peripheral side and have a great curl diameter may be therefore less likely to get stuck. The distance from the lower surface 5 to the bottom part 15 in the region located between the certain region X2 and the certain region X3 may increase as going away from the certain region X2.

The second segment 13B may have a circular-arc shape protruding toward the lower surface 5 in a cross section orthogonal to the first side 3b1 as illustrated in FIGS. 5 to 8. A shape of a chip after passing through the breaker part 13 may become one which is obtained by transfer of a shape of the second segment 13B. In cases where the second segment 13B has the above shape, chips may tend to be drawn into the breaker part 13, thereby making it possible to decrease a curl diameter of the chips.

Specifically, as illustrated in FIGS. 5 and 8, a radius of curvature R2 of the second segment 13B in the cross section orthogonal to the first side 3b1 at a side of the second corner 3a2 may be greater than a radius of curvature R1 of the second segment 13B in the cross section orthogonal to the first side 3b1 at a side of the first corner 3a1. With this configuration, a part of a flowing chip having a transferred shape of the second segment 13B of the breaker part 13 which is located at the outer peripheral side of the drill and has a great curl diameter can be brought into a smooth contact with a breaker surface having a relatively large radius of curvature. The chip at the outer peripheral side may be less likely to get stuck.

For example, the radius of curvature R1 and the radius of curvature R2 of the second segment 13B can be calculated by using contact points of three arbitrary points or more on a line segment of the second segment 13B in the cross section orthogonal to the first side 3b1 as illustrated in FIGS. 5 and 8. The radius of curvature R1 may be settable to, for example, 0.4-1 mm. The radius of curvature R2 may be settable to, for example, 0.7-1.5 mm.

The breaker part 13 may include a first region 17, a second region 18 and a third region 19 located in order from a side of the first corner 3a1 to a side of the second corner 3a2. In this case, these regions may satisfy the following relationship.

A radius of curvature r1 of the second segment 13B in the first region 17 may be constant in the non-limiting embodiment illustrated in FIG. 5. A radius of curvature r2 of the second segment 13B in the third region 19 may be constant in the non-limiting embodiment illustrated in FIG. 8, and may be greater than the radius of curvature r1 of the second segment 13B in the first region 17. A radius of curvature r2 of the second segment 13B in a cross section orthogonal to the first side 3b1 in the second region 18 may increase as going from a side of the first region 17 toward a side of the third region 19 in the non-limiting embodiments respectively illustrated in FIGS. 6 and 7.

A corner portion may be generated at the third segment 13C in a boundary part between the first region 17 and the second region 18, and at the third segment 13C in an end portion of the third region 19 which is located at a side of the second corner 3a2. These corner portions may be capable of serving as a guide to reduce the probability that generated chips flow in an outer peripheral direction of the drill due to centrifugal force. A chip discharge direction can thus become stable to enhance chip discharge performance.

The radius of curvature R1 (a radius of curvature at the side of the first corner 3a1) may have the same value as the radius of curvature r1. The radius of curvature R2 (a radius of curvature at the side of the second corner 3a2) may have the same value as the radius of curvature r3.

The first region 17 may coincide with the certain region X2. Specifically, the radius of curvature of the second segment 13B (the radius of curvature R1, the radius of curvature r1) may be constant and a distance (distance L1) from the first side 3b1 to the top portion 16 of the third segment 13C may be constant in the first region 17.

Similarly, the third region 19 may coincide with the certain region X3. Specifically, the radius of curvature of the second segment 13B (the radius of curvature R2, the radius of curvature r3) may be constant and a distance (distance L2) from the first side 3b1 to the top portion 16 of the third segment 13C may be constant in the third region 19.

The first segment 13A and the third segment 13C may have a flat inclined surface as illustrated in FIGS. 5 to 8. Specifically, the first segment 13A may be a flat downward inclined surface, and the third segment 13C may be flat upward inclined surface.

In cases where the third segment 13C is the flat upward inclined surface, even upon occurrence of a change in contact point between chips and the third segment 13C due to a change in cutting conditions, the chips may tend to be brought into surface contact with the third segment 13C. This may make it possible for the generated chips to stably come into contact with the third segment 13C even under different cutting conditions. Consequently, good chip discharge performance may be ensured in a wide range of cutting conditions.

As illustrated in FIG. 3, the first side 3b1 may include a first part 3b11 having a curvilinear shape protruding toward the lower surface 5, and the top portion 16 of the third segment 13C may include a portion whose distance to the first part 3b11 is constant in a side view. The first part 3b11 having the curvilinear shape can be rephrased as the first curvilinear part 3b11. With this configuration, both ends of a chip generated by transfer of the shape of the cutting edge 9 can be stably brought into contact with the third segment 13C. This may lead to effective chip curling action by the breaker part 13.

The phrase that "the distance between the top portion 16 of the third segment 13C and the first part 3b11 is constant" may denote that the distance therebetween may be substantially constant without requiring strict constant. That is, both may be deviated by approximately ±1 mm.

Examples of the curvilinear shape of the first part 3b11 may include a circular-arc shape. In cases where the first part 3b11 has the circular-arc shape, a radius of curvature of the first part 3b11 may be settable to, for example, 15-35 mm.

A portion of the first part 3b11 which is located closest to the lower surface 5 may be located closer to the first corner 3a1 than a midpoint M of the first part 3b11. In this case, a portion of the first part 3b11 which is located closest to the lower surface 5 may also be located closest to the lower surface 5 in the entirety of the first side 3b1.

With the above configuration, a region of the cutting edge 9 which has a relatively small cutting edge height can be ensured widely at an inner peripheral side. This may lead to relatively strong breaking action by the breaker part 13 at the inner peripheral side, thereby improving chip discharge performance at the side of the inner peripheral side.

As illustrated in FIG. 3, each of the first region 17, the second region 18 and the third region 19 may be a region of the upper surface 3 which is located inside of the first part 3b11. Specifically, if both ends of the first part 3b11 are respectively referred to as p1 and p2, each of the first region 17, the second region 18 and the third region 19 may be located closer to the central axis X1 than both ends p1 and p2 of the first part 3b11 in a side view as illustrated in FIG. 3.

With the above configuration, the first region 17, the second region 18 and the third region 19 may be located correspondingly to the first part 3b11. This may enhance the effect of stably bringing both ends of a chip generated by transfer of the shape of the first part 3b11 if the first part 3b11 is used as a part of the cutting edge 9, into contact with the third segment 13C of the breaker part 13.

As illustrated in FIG. 4, the top portion 16 of the third segment 13C may have a portion whose distance to the first part 3b11 is constant in a top view.

If the top portion 16 of the third segment 13C has the above configuration, a cutting speed difference between the inner peripheral side and the outer peripheral side of the drill may be small during a turning process. It is therefore easy to stably bring the chip into contact with the third segment 13C even in cutting conditions under which there is no significant difference between a chip curl diameter on the inner peripheral side and that on the outer peripheral side.

As illustrated in FIGS. 2 to 4, the first side 3b1 may further include a second part 3b12 and a third part 3b13 located closer to the second corner 3a2 than the first part 3b11. In this case, as illustrated in FIG. 3, the second part 3b12 may have a curvilinear shape being recessed with respect to the lower surface 5, and the third part 3b13 may have a straight line shape in a side view.

The above configuration may ensure smooth connection between the first part 3b11 having the recessed curvilinear shape and the third part 3b13 having the straight line shape at the first side 3b1. In cases where the second part 3b12 has the curvilinear shape, the second part 3b12 may be rephrased as the second curvilinear part 3b12.

Alternatively, as illustrated in FIG. 3, the second part 3b12 and the third part 3b13 may be located closer to the second corner 3a2 than the top portion 16 of the third segment 13C at the side of the second corner 3a2 in a side view.

Similarly to the first part 3b11, examples of the curvilinear shape of the second part 3b12 may include a circular-arc shape. If the second part 3b12 has the circular-arc shape, a radius of curvature of the second part 3b12 may be settable to, for example, 3.5-9 mm. If the first part 3b11 and the second part 3b12 have the circular-arc shape, the radius of curvature of the first part 3b11 may be greater than the radius of curvature of the second part 3b12.

Although the first side 3b1 in the non-limiting embodiment illustrated in FIG. 3 may include the first part 3b11, the second part 3b12 and the third part 3b13, the first side 3b1 may not be limited to one which is composed only of these parts. Specifically, a connection portion (not illustrated) that smoothly connects these parts each other may be disposed therebetween. For example, a straight line shaped portion may be disposed between the first part 3b11 and the second part 3b12.

A so-called honing process may be applied to a part of a ridge line where the upper surface 3 intersects with the side surface 7 and the cutting edge 9 is formed. That is, the ridge line where the upper surface 3 intersects with the side surface 7 may not need to be a strict line shape obtained by intersection of two surfaces. The cutting edge 9 may have enhanced strength by applying the honing process to a region where the upper surface intersects with the side surface 7. Examples of the honing process may include a round honing process that brings the region into a curved surface shape.

<Cutting Tool (Drill)>

A drill 101 of a non-limiting embodiment may be described below with reference to the drawings.

Figure 9:
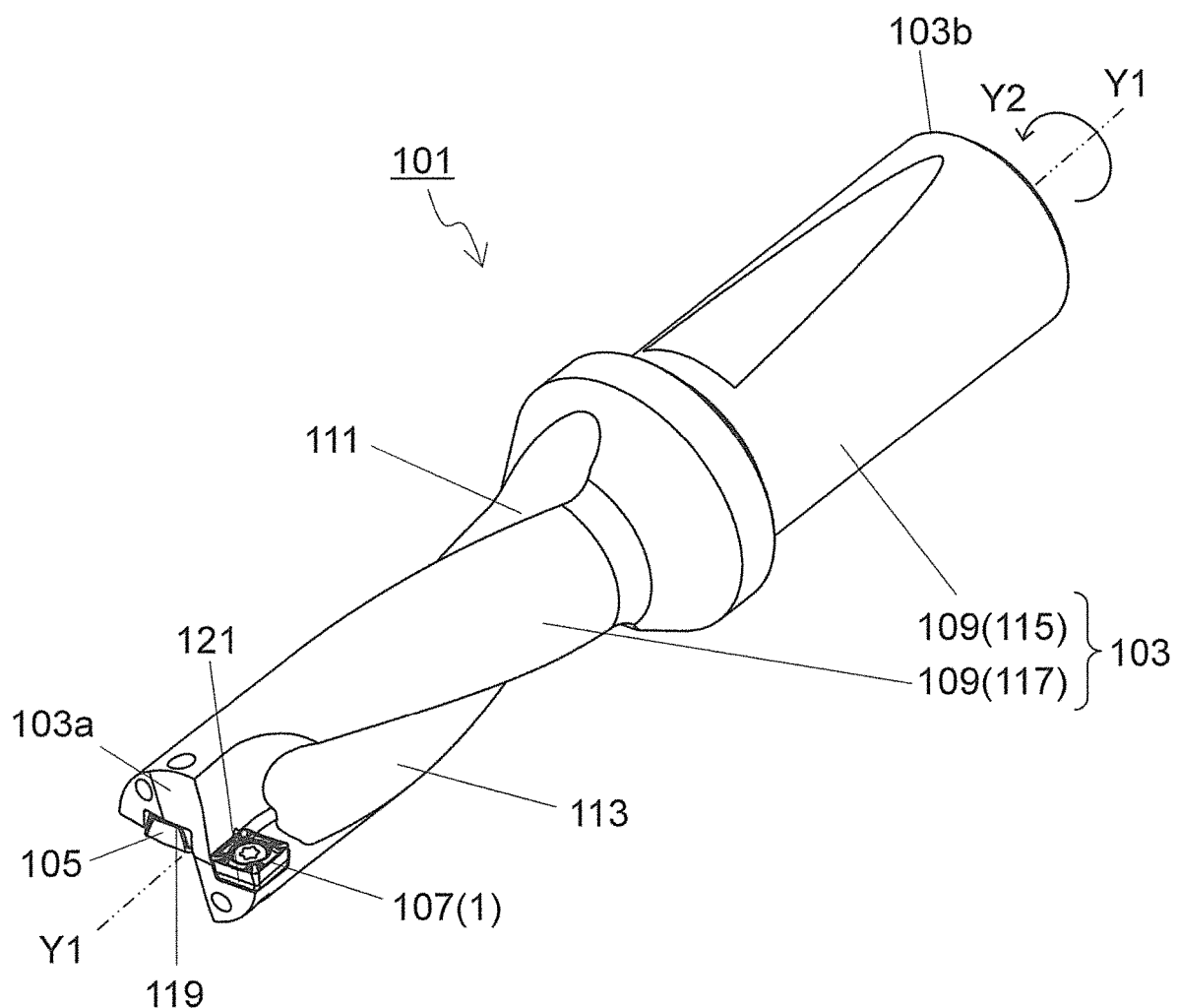
FIG. 9 is a perspective view illustrating a drill in a non-limiting embodiment.
Figure 10:
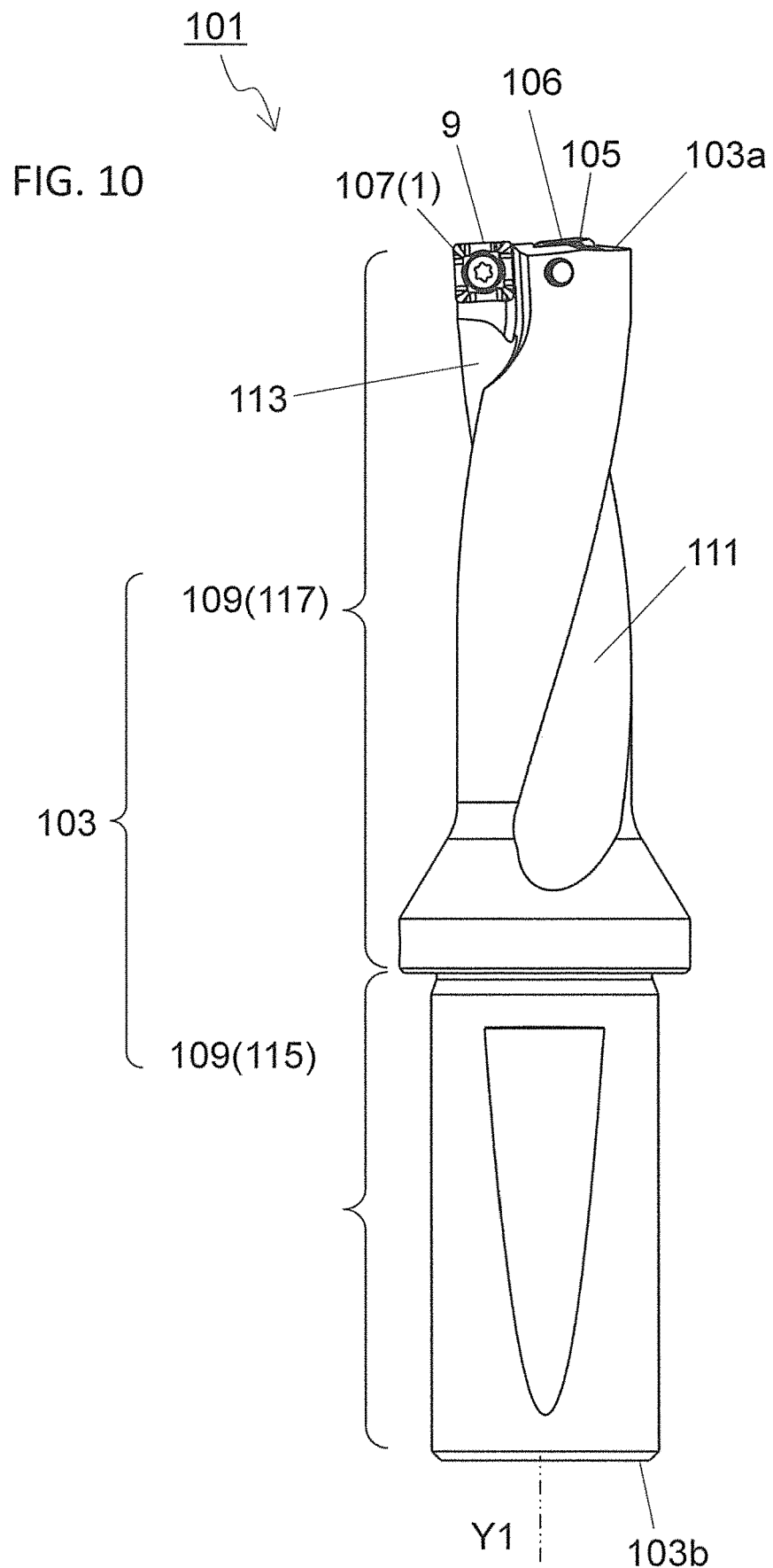
FIG. 10 is a side view of the drill illustrated in FIG. 9 in the B1 direction.
Figure 11:
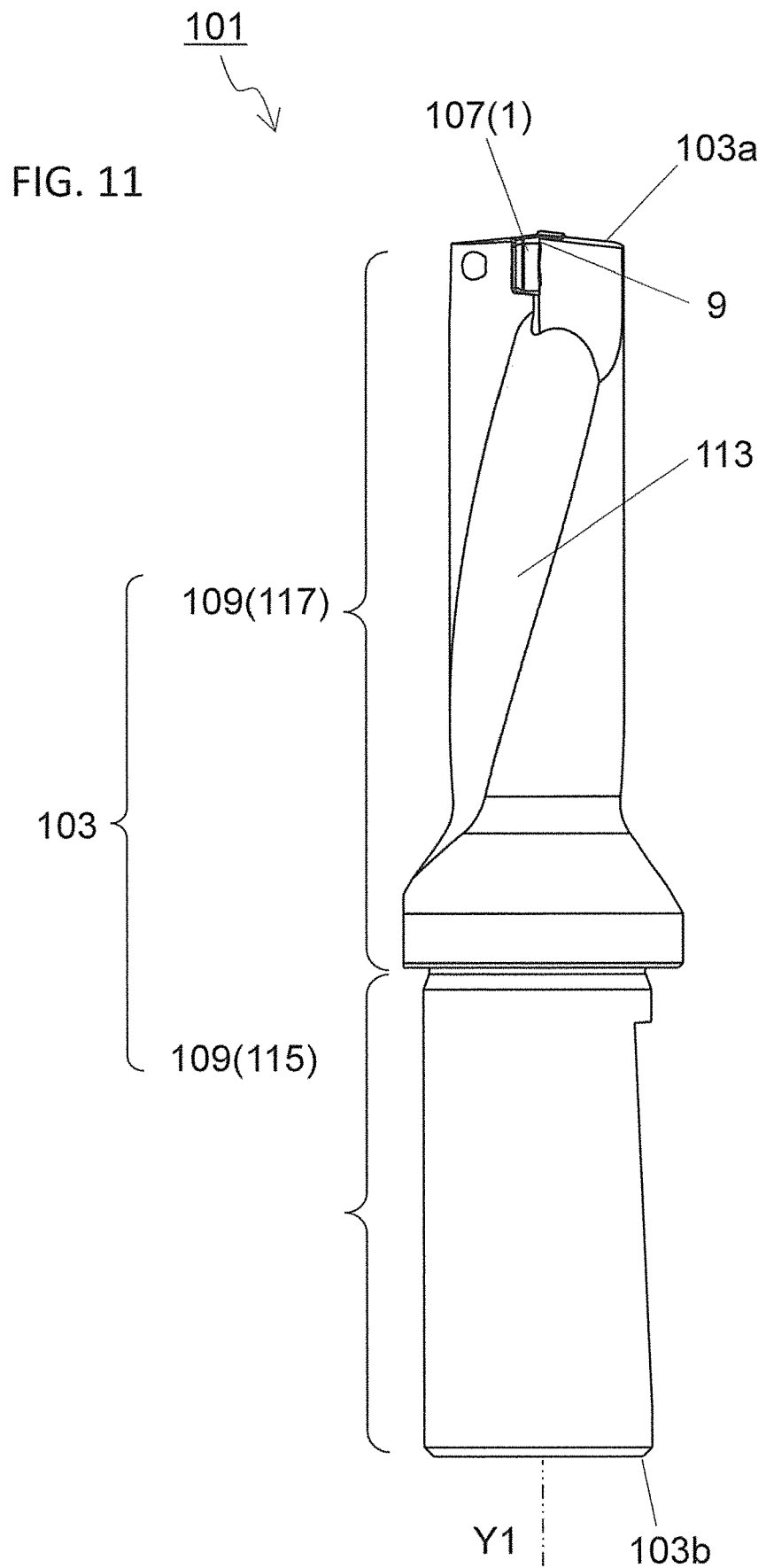
FIG. 11 is a side view of the drill illustrated in FIG. 9 in the B2 direction.

As illustrated in FIGS. 9 to 11, the drill 101 of the non-limiting embodiment may include a holder 103 having a bar-shape, extending along a rotation axis Y1, and an inner edge insert 105 and an outer edge insert 107 which are attached to a first end 103a of the holder 103. The drill 101 may be usable for a boring process. The insert 1 illustrated according to a non-limiting embodiment of the present disclosure may be used as the outer edge insert 107. An insert different from the insert 1 according to a non-limiting embodiment may be used as the inner edge insert 105 in the present disclosure. Alternatively, the insert 1 according to a non-limiting embodiment may also be used as the inner edge insert 105 in addition to the outer edge insert 107.

The holder 103 may include a main body 109, a first chip discharge flute 111 (hereinafter also referred to simply as "a first flute 111"), and a second chip discharge flute 113 (hereinafter also referred to simply as "a second flute 113"). The main body 109 may have a bar shape that extends along a rotation axis Y1 in a direction from the first end 103a to the second end 103b. The main body 109 rotates around the rotation axis Y1 during a cutting process.

The main body 109 may include a holding section 115 which is called "shank" and held by, for example, a rotating spindle of a machine tool (not illustrated), and a cutting section 117 which is called "body" and located closer to the first end 103a than the holding section 115. The holding section 115 may be a section to be designed according to the shape of the spindle and the like in the machine tool. The cutting section 117 may be a section whose end at a side of the first end 103 is configured to accept attachment of the inserts 105 and 107. The cutting section 117 may play a major role in the cutting process of a workpiece. Arrow Y2 may indicate a rotation direction of the main body 109.

An inner pocket 119 and an outer pocket 121 may be disposed at a side of the first end 103a of the cutting section 117 in the main body 109. The inner pocket 119 may be a recessed portion which is disposed at an inner peripheral side at a side of the first end 103a of the cutting section 117, and which is configured to accept attachment of the inner edge insert 105. The outer pocket 121 may be a recessed portion which is disposed at an outer peripheral side at a side of the first end 103a of the cutting section 117, and which is configured to accept attachment of the outer edge insert 107.

The outer pocket 121 may be located further away from the rotation axis Y1 than the inner pocket 119 as illustrated in FIG. 9. In order to avoid contact of the inner edge insert 105 with the outer edge insert 107, the inner pocket 119 and the outer pocket 121 may be located away from each other. The term "inner peripheral side" may denote a side close to the rotation axis Y1. The term "outer peripheral side" may denote a side away from the rotation axis Y1.

The inner edge insert 105 and the outer edge insert 107 may be respectively located at the inner pocket 119 and the outer pocket 121 and may be detachably attached thereto. In other words, the inner edge insert 105 may be attached to the inner peripheral side at the first end 103a of the holder 103, and the outer edge insert 107 (insert 1) may be attached to the outer peripheral side at the first end 103a of the holder 103. The inner edge insert 105 may be attached so that a cutting edge 106 of the inner edge insert 105 intersects with the rotation axis Y1.

A rotational track of the cutting edge 106 in the inner edge insert 105 may be partially overlapped with a rotational track of the cutting edge 9 in the outer edge insert 107 (not illustrated) in a front end view. The rotational track of the cutting edge 106 in the inner edge insert 105 and the rotational track of the cutting edge 9 in the outer edge insert 107 may be overlapped with the entirety of the cutting section 117 of the main body 109 in the front end view. A boring process having an outer diameter of the cutting section 117 of the main body 109 may be performable by the cutting edge 106 of the inner edge insert 105 and the cutting edge 9 of the outer edge insert 107 thus arranged.

The term "front end view" may denote a state in which the drill 101 is viewed toward the first end 103a of the holder 103. An end portion of the first part which is located at the outer peripheral side may correspond to one of both end portions of the first part which is located at a side of the second part.

As illustrated in FIGS. 9 to 11, the first flute 111 may extend spirally around the rotation axis Y1 in a direction from the inner edge insert 105 toward a side of the second end 103b of the holder 103. The second flute 113 may extend spirally around the rotation axis Y1 in a direction from the outer edge insert 107 toward a side of the second end 103b of the holder 103. The first flute 111 and the second flute 113 may be located at the cutting section 117 in the main body 109 but not the holding section 115 in the non-limiting embodiment illustrated in FIG. 9.

An outer diameter of the cutting section 117 may be settable to, for example, 6-42.5 mm. For example, it may be $E=2F$ to $12F$, in which E is a length of an axial line (a length of the cutting section 117), and F is a diameter (an outer diameter of the cutting section 117).

As a material of the main body 109, for example, steel, cast iron and aluminum alloy may be usable. Of these materials, steel may be used in view of its high rigidity in a non-limiting embodiment.

The first flute 111 may be intended mainly to discharge chips generated by the cutting edge 106 of the inner edge insert 105. During a cutting process, the chips generated by the inner edge insert 105 may be discharged through the first flute 111 to a side of the second end 103b of the main body 109. The second flute 113 may be intended mainly to discharge chips generated by the cutting edge 9 of the outer edge insert 107. During the cutting process, the chips generated by the outer edge insert 107 may be discharged through the second flute 113 to a side of the send end 103b of the main body 109.

A depth of each of the first flute 111 and the second flute 113 may be settable to, for example, approximately 10-40% of an outer diameter of the cutting section 117. The term "the depth of each of the first flute 111 and the second flute 113" may denote a value obtainable by subtracting a distance between a bottom of each of the first flute 111 and the second flute 113 and the rotation axis Y1, from a radius of the cutting section 117 in a cross section orthogonal to the rotation axis Y1.

A diameter of a web thickness may be settable to, for example, approximately 20-80% of the outer diameter of the cutting section 117. The diameter of the web thickness may correspond to a diameter of a maximum circle (an inscribed circle) formable in the cross section of the cutting section 117 orthogonal to the rotation axis Y1. Specifically, for example, if the outer diameter D of the cutting section 117 is 20 mm, the depth of each of the first flute 111 and the second flute 113 may be settable to approximately 2-8 mm.

With the drill 101 in the present disclosure, because the insert 1 is used as the outer edge insert 107, chip clogging may be less likely to occur and a stable chip discharge may be attainable even in the case of machining soft chips, such as mild steel. This may lead to enhanced machined surface accuracy of the workpiece.

<Method of Manufacturing Machined Product>

A method of manufacturing a machined product according to a non-limiting embodiment of the present disclosure may be described below with reference to FIGS. 12 to 14 by exemplifying the case of using the drill 101 in the foregoing non-limiting embodiment.

The method of manufacturing a machined product in the non-limiting embodiment may include the following steps (1) to (4).

Figure 12:
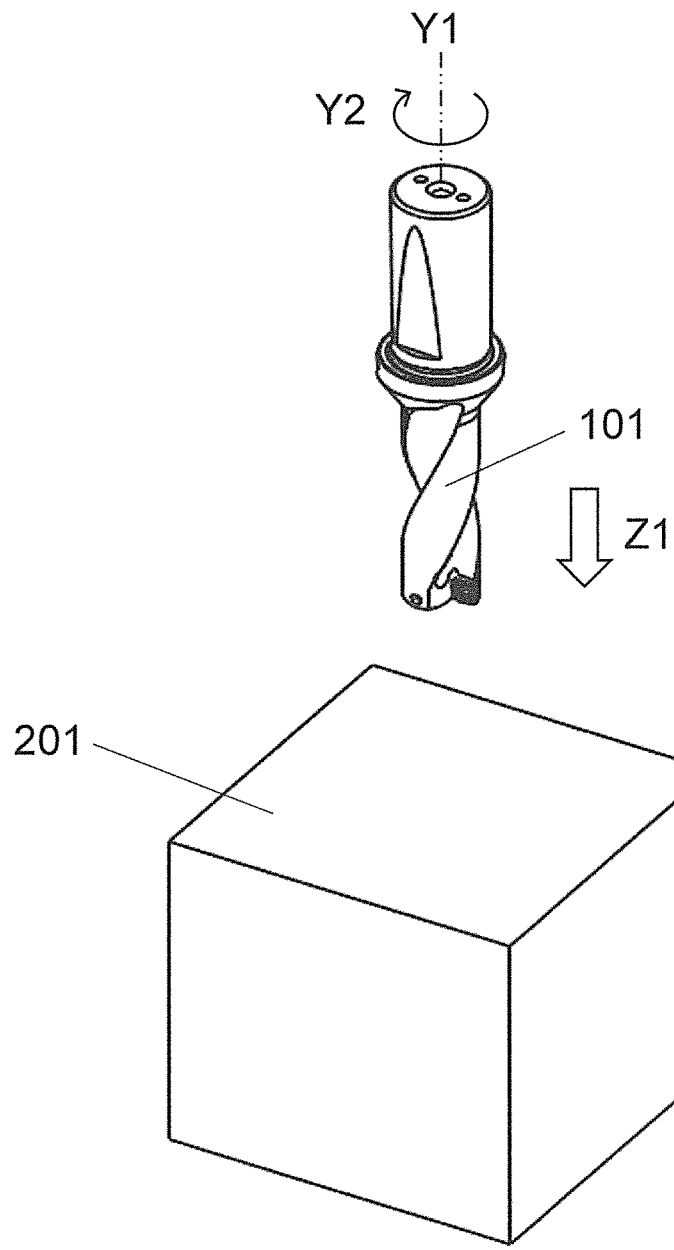
FIG. 12 is a diagram illustrating one of the steps in a method of manufacturing a machined product in a non-limiting embodiment.

The step (1) may be to put the drill 101 (cutting tool) above a prepared workpiece 201 (refer to FIG. 12).

Figure 13:
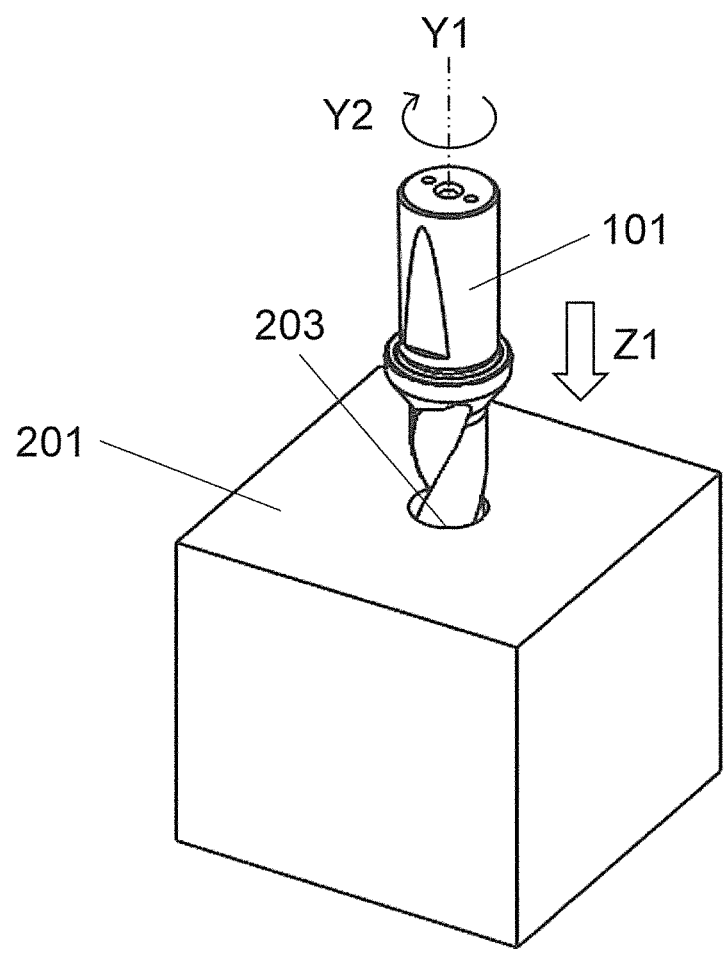
FIG. 13 is a diagram illustrating one of the steps in the method of manufacturing a machined product in a non-limiting embodiment.

The step (2) may be to rotate the drill 101 around the rotation axis Y1 in a direction indicated by arrow Y2, and bringing the drill 101 closer to the workpiece 201 in Z1 direction (refer to FIGS. 12 and 13).

The step (3) may be to form a drilled hole 203 in the workpiece 201 by bringing the drill 101 further closer to the workpiece 201 so as to cause the cutting edge of the drill 101 being rotated to come into contact with a desired position on the surface of the workpiece 201 (refer to FIG. 13).

Figure 14:
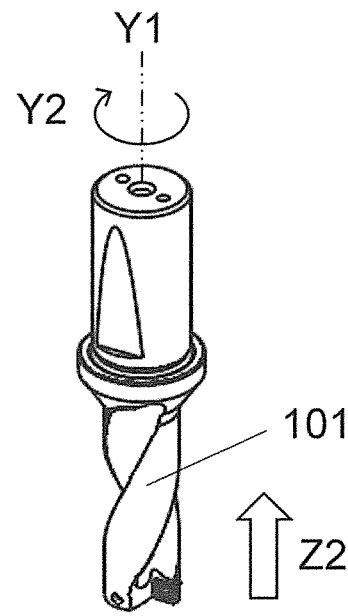
FIG. 14 is a diagram illustrating one of the steps in the method of manufacturing a machined product in a non-limiting embodiment.
Figure 14:
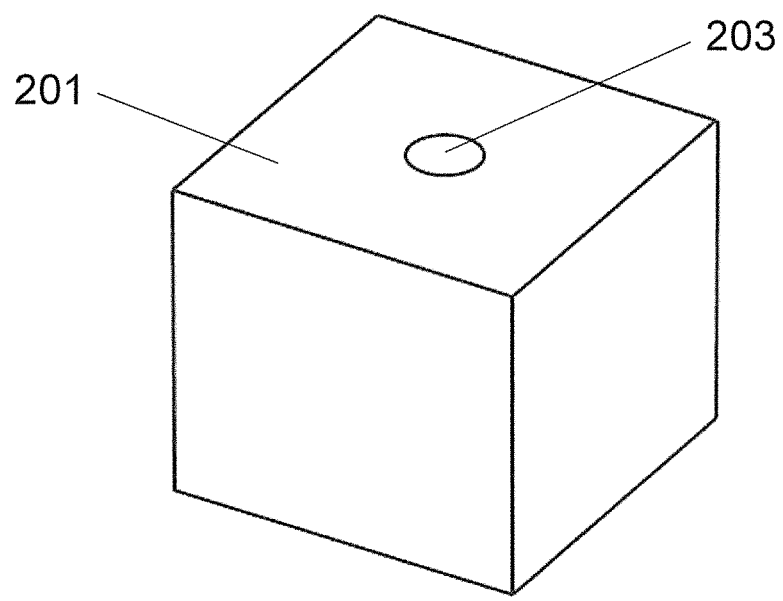

The step (4) may be to separate the drill 101 from the workpiece 201 in Z2 direction (refer to FIG. 14).

Examples of material of the workpiece 201 prepared in the step (1) may include aluminum, carbon steel, alloy steel, stainless, stainless steel, cast iron and nonferrous metals.

The step (2) may be performable by, for example, fixing the workpiece 201 onto a table of the machine tool having the drill 101 attached thereto, and then by bringing the drill 101 being rotated closer to the workpiece 201. In this step, the workpiece 201 and the drill 101 may be relatively close to each other. Alternatively, the workpiece 201 may be brought closer to the drill 101.

In the step (3), a setting may be made so that a partial region at a side of the second end of the cutting section of the drill 101 does not come into contact with the workpiece 201, from the viewpoint of obtaining a good finished surface. In other words, excellent chip discharge performance may be producible through the partial region by causing the partial region to serve as a chip discharge region.

Also in the step (4), the workpiece 201 and the drill 101 may be relatively separated from each other as in the case with the above step (2). For example, the workpiece 201 may be separated from the drill 101.

The machined product having the drilled hole 203 may be obtainable through the steps as described above. With the method of manufacturing a machined product in the non-limiting embodiment, the cutting process may be performable while smoothly discharging chips because of the use of the drill 101. It may be consequently possible to obtain the machined product including the highly accurate drilled hole 203.

If the foregoing cutting process of the workpiece 201 is carried out a plurality of times, for example, if forming a plurality of the drilled holes 203 in a single workpiece 201, the step of bringing the cutting edge of the drill 101 into contact with different portions of the workpiece 201, while keeping the drill 101 rotated, may be repeated.

Although the non-limiting embodiments in the present disclosure have been illustrated and described above, the present disclosure may not be limited thereto. It is, of course, possible to make any optional ones insofar as they do not depart from the gist of the present disclosure.

DESCRIPTION OF THE REFERENCE NUMERALS

1 cutting insert (insert)
3 first surface (upper surface)
   3*a* corner
   3*a*1 first corner
   3*a*2 second corner
   3*b* side
   3*b*1 first side
   3*b*11 first part
   3*b*12 second part
   3*b*13 third part
5 lower surface
7 side surface
9 cutting edge
11 through hole
13 breaker part
   13A first segment
   13B second segment
   13C third segment
   13D first top surface
   13E second top surface
15 bottom part
16 top portion
17 first region
18 second region
19 third region
101 drill
103 holder
   103*a* first end
   103*b* second end
105 inner edge insert (first cutting insert)
106 cutting edge
107 outer edge insert
109 main body
111 first chip discharge flute (first flute)
113 second chip discharge flute (second flute)
115 holding section
117 cutting section
119 inner pocket
121 outer pocket
201 workpiece
203 drilled hole
P1, p2 both ends of first part

What is claimed is:

1. A cutting insert, comprising:
a first surface comprising a first side, a first corner and a second corner each being adjacent to the first side, and a breaker part located along the first side;
a second surface located on an opposite side of the first surface; and
a third surface located between the first surface and the second surface and along the first side,
wherein
the breaker part comprises a first segment, a second segment and a third segment located in order from the first side;
the first segment is an inclined surface approaching the second surface when going away from the first side;
the third segment is an inclined surface inclined going away from the second surface when going away from the second segment;
an entirety of the second segment is located closer to the second surface than the first side;
at least a portion of the third segment is located further away from the second surface than the first side;
a distance from the first side to a top portion of the third segment on an orthogonal line with respect to the first side is a first distance in a front view of the first surface;
a maximum value of the first distance at a side of the second corner is greater than a maximum value of the first distance at a side of the first corner;
the breaker part further comprises a first top surface located further inside of the first surface than the third segment at a side of the first corner, and a second top surface located further inside of the first surface than the third segment at a side of the second corner;

the first top surface approaches the second surface as going from a side of the first corner toward a side of the second corner; and the second top surface approaches the second surface as going away from the first side.

2. The cutting insert according to claim 1, wherein the breaker part further comprises a bottom part extending along the first side, a distance from the first side to the bottom part on an orthogonal line with respect to the first side is a second distance in the front view of the first surface, and a maximum value of the second distance at a side of the second corner is greater than a maximum value of the second distance at a side of the first corner.

3. The cutting insert according to claim 1, wherein the breaker part further comprises a bottom part extending along the first side, a distance from the second surface to the bottom part on an orthogonal line with respect to the first side is a third distance in the front view of the first surface, and a maximum value of the third distance at a side of the second corner is smaller than a maximum value of the third distance at a side of the first corner.

4. The cutting insert according to claim 1, wherein the second segment has a circular-arc shape curved toward the second surface in a cross section orthogonal to the first side.

5. The cutting insert according to claim 4, wherein a radius of curvature of the second segment in a cross section orthogonal to the first side at a side of the second corner is greater than a radius of curvature of the second segment in a cross section orthogonal to the first side at a side of the first corner.

6. The cutting insert according to claim 5, wherein the breaker part further comprises a first region, a second region, and a third region located in order from a side of the first corner toward a side of the second corner;

a radius of curvature of the second segment in a cross section orthogonal to the first side in the first region is constant;

a radius of curvature of the second segment in a cross section orthogonal to the first side in the third region is constant and greater than the radius of curvature of the second segment in the cross section orthogonal to the first side in the first region; and a radius of curvature of the second segment in a cross section orthogonal to the first side in the second region increases as going from a side of the first region toward a side of the third region.

7. The cutting insert according to claim 1, wherein, in a front view of the third surface, the first side comprises a first curvilinear part having a curvilinear shape curved toward the second surface, and the top portion of the third segment comprises a portion whose distance to the first curvilinear part is constant.

8. The cutting insert according to claim 7, wherein the top portion of the third segment comprises a portion whose distance to the first curvilinear part is constant in a front view of the first surface.

9. The cutting insert according to claim 7, wherein, in a front view of the third surface;

the first side further comprises a second curvilinear part which is located closer to a side of the second corner than the first curvilinear part, and which has a curvilinear shape curved away from the second surface; and the second curvilinear part is located closer to a side of the second corner than the top portion of the third segment at a side of the second corner.

10. The cutting insert according to claim 1, wherein an inclination angle of the first segment is constant along the first side.

11. The cutting insert according to claim 1, wherein an inclination angle of the third segment at a side of the second corner is smaller than an inclination angle of the third segment at a side of the first corner.

12. A drill, comprising:

a holder having a bar-shape, extending along a rotation axis from a first end toward a second end; and the cutting insert according to claim 1, the cutting insert being located at a side of the first end of the holder.

13. A method of manufacturing a machined product, comprising:

rotating the drill according to claim 12 around the rotation axis;

bringing the drill being rotated into contact with a workpiece; and separating the drill from the workpiece.

* * * * *